(12) United States Patent
Huang (10) Patent No.: US 7,040,175 B1
(45) Date of Patent: May 9, 2006

(54) PRESSURE READING STRUCTURE FOR A PRESSURE GAGE

(76) Inventor: Tien-Tsai Huang, No. 4, Lane 30, Wu Chuan St., Pan Chiao City, Taipei County (TW)

( * ) Notice: Subject to any disclaimer, the term of this patent is extended or adjusted under 35 U.S.C. 154(b) by 0 days.

(21) Appl. No.: 11/023,464

(22) Filed: Dec. 29, 2004

(30) Foreign Application Priority Data

Nov. 24, 2004 (TW) .............................. 93218873 U (51) Int. Cl.
   G01L 7/04  (2006.01)
   G01D 13/00  (2006.01)
   G01D 11/00  (2006.01)
   B60C 23/06  (2006.01)

(52) U.S. Cl. .................. 73/732; 116/284; 116/304; 116/34 R (58) Field of Classification Search ................ 73/700, 73/732, 756; 33/327, 333; 116/284, 328, 116/34 R, 304, 305
See application file for complete search history.

(56) References Cited

U.S. PATENT DOCUMENTS

| 4,143,466 | A | * | 3/1979 | Quermann | .................... | 33/327 |
| 4,670,988 | A | * | 6/1987 | Baxter | ........................ | 33/333 |
| 6,763,725 | B1 | * | 7/2004 | Huang | ........................ | 73/756 |

* cited by examiner

Primary Examiner—Jewel V. Thompson
(74) Attorney, Agent, or Firm—Bacon & Thomas, PLLC (57) ABSTRACT

An improved pressure reading structure for a pressure gage is disclosed, comprising a data plate, a rotable pointer and a protection casing. The data plate includes a central area and an extended area next to and connected to the central area, both of the areas being positioned on different planes to serve as an upper area and a lower area thereof respectively. In addition, the rotable pointer has a first end mounted above the central area of the data plate, a second end mounted above the extended area of the data plate, and a needle relative to the data plate to form a space. Accordingly, tire pressure can be read from different view angles, and also, use of the pressure gage becomes more convenient.

6 Claims, 8 Drawing Sheets

PRESSURE READING STRUCTURE FOR A PRESSURE GAGE

BACKGROUND OF THE INVENTION

1. Field of the Invention

The present invention relates to an improved reading structure, and more particularly to an improved pressure reading structure for a pressure gage.

2. Description of Related Art

At present, a device for measuring pressure is usually called "pressure gage" used generally for measuring a gas pressure or a fluid pressure. It can be called in different names in accordance with the field of usage; for example, a tire pressure gage is used for measuring the pressure of a tire, and a fire gage is used for measuring the inner pressure of a fire extinguishing tank. In general, pressure gage can be categorized into a non-fluid type and a fluid (oil-filled) type, of which difference exists from each other in that the latter is filled with glycerin or the like internally so as to provide an aseismatic effect among the internal parts of the pressure gage by the viscosity of the fluid.

Nevertheless, it is common that there is usually a planar data plate and that the reading structure for indicating pressure shown by a rotable pointer in coordination with indicia on the data plate is usually directional, regardless of what type of the pressure gage is. The view angle for observing gage pressure is usually narrow when a user wants to read the pressure so measured. Hence, it is very inconvenient for some occasions in use. For example, when the tire pressure gage is used to measure the tire pressure of a large vehicle, the user has to move his body to fit in with the position where the tire pressure gage is placed so that the pressure can be read from the top of the tire pressure gage. In case the tire pressure gage is placed nearby the inner bottom side of the vehicle, the user has to crawl underneath the vehicle to read the tire pressure. This not only causes inconvenience for usage, but also tends to harm the user.

Therefore, it is desirable to provide an improved pressure reading structure for a pressure gage to mitigate and/or obviate the aforementioned problems.

SUMMARY OF THE INVENTION

The present invention provides an improved pressure reading structure for a pressure gage, comprising a data plate; a rotable pointer having a first end to serve as a rotation center, a second end to serve as an indicating end, and a needle between the first end and the second end; and a protection casing. In the improved pressure reading structure for a pressure gage, the data plate includes a central area and an extended area, serving as an upper area and a lower area thereof respectively. The extended area is disposed next to and connected to the central area, both of the areas being positioned on different planes. The first end of the rotable pointer is mounted above the central area of the data plate, while the second end of the rotable pointer is mounted above the extended area of the data plate. The needle stands relative to the data plate to form a space. Accordingly, gage pressure can be read from different view angles, and also, use of the pressure gage becomes more convenient.

The data plate is a three-dimensional body shaped as an arc, a semi-circle or a cylinder. Also, the needle of the rotable pointer is shaped as an arc or has a corresponding corner, having the same function as increasing the convenience in reading the tire pressure.

In addition, the data plate or the protection casing has indicia thereon for providing an indication of the tire pressure.

The protection casing can be transparent and rotable, having a symbol thereon to provide a warning function.

Other objects, advantages, and novel features of the invention will become more apparent from the following detailed description when taken in conjunction with the accompanying drawings.

DETAILED DESCRIPTION OF THE PREFERRED EMBODIMENT

Implementations of the present invention include eight preferred embodiments, in which the components corresponding to one another in the embodiments will be given the same reference numerals.

Figure 1:
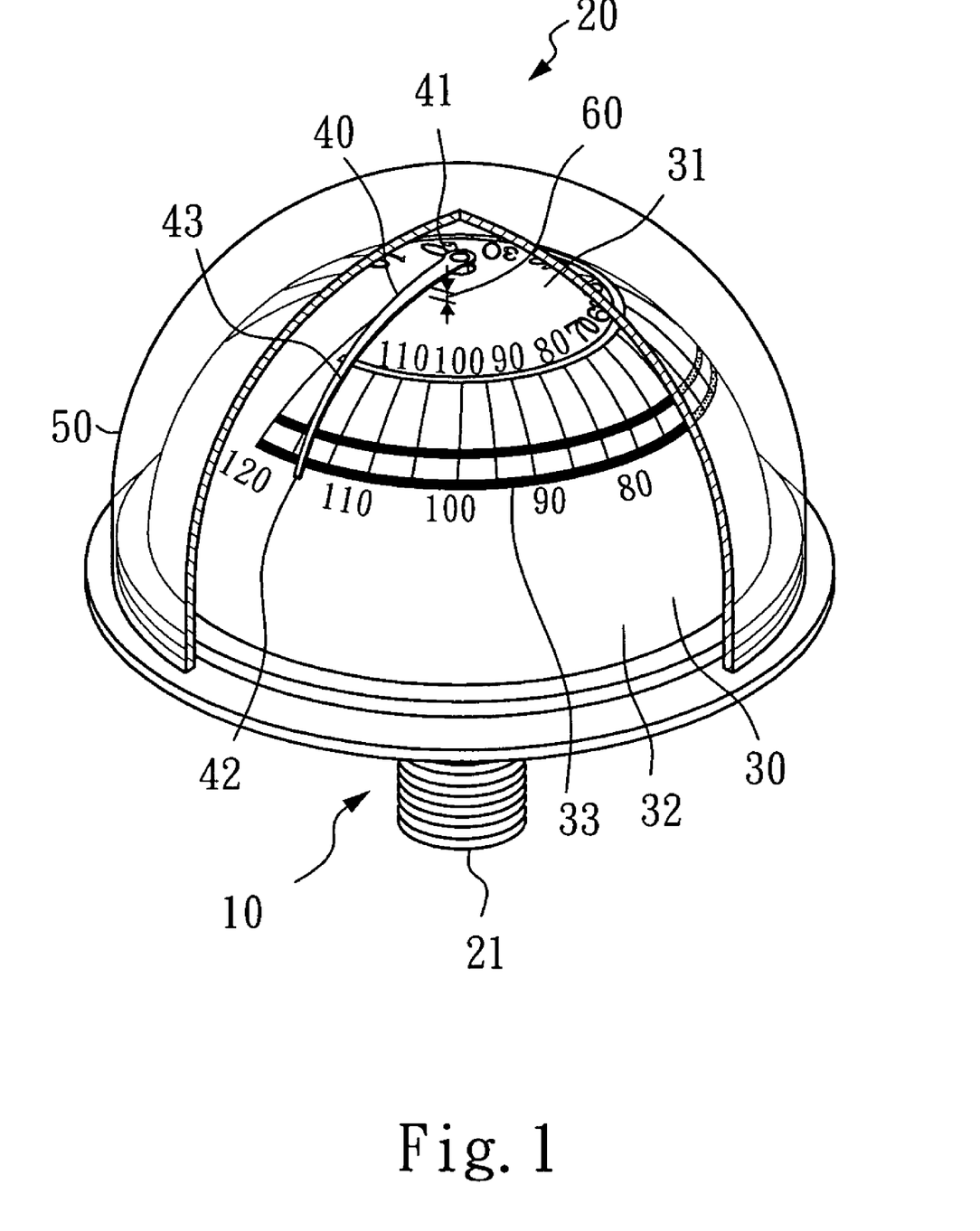
FIG. 1 is a schematic view of a first preferred embodiment of the present invention.

FIG. 1 is a schematic view of a first embodiment of the present invention. A pressure gage 10 has an improved pressure reading structure 20 which comprises a data plate 30, a rotable pointer 40 and a protection casing 50. A threading tube 21 having external male screws projects from the bottom of the improved pressure reading structure 20 to serve as an inlet. The rotable pointer 40 has a first end 41 to serve as a rotation center, a second end 42 to serve as an indicating end, and a needle 43 between the first end 41 and the second end 42. The present invention is featured by the data plate 30 shaped as a semi-circle casing including a central area 31 and an extended area 32 next to and connected to the central area 31, both of the areas being positioned on different planes. Namely, the upper area of the data plate 30 in the shape of a semi-circle casing is the central area, while the lower area of the data plate 30 in the shape of a semi-circle casing is the extended area. The first end 41 of the rotable pointer 40 is mounted above the central area 31, while the second end 42 of the rotable pointer 40 is mounted above the extended area 32. Also, the needle 43 is in the shape of an arc, standing relative to the data plate 30 to form a space 60. The data plate 30 (the extended area 32 and the central area 31) has indicia thereon for facilitating a reading of tire pressure.

Figure 2:
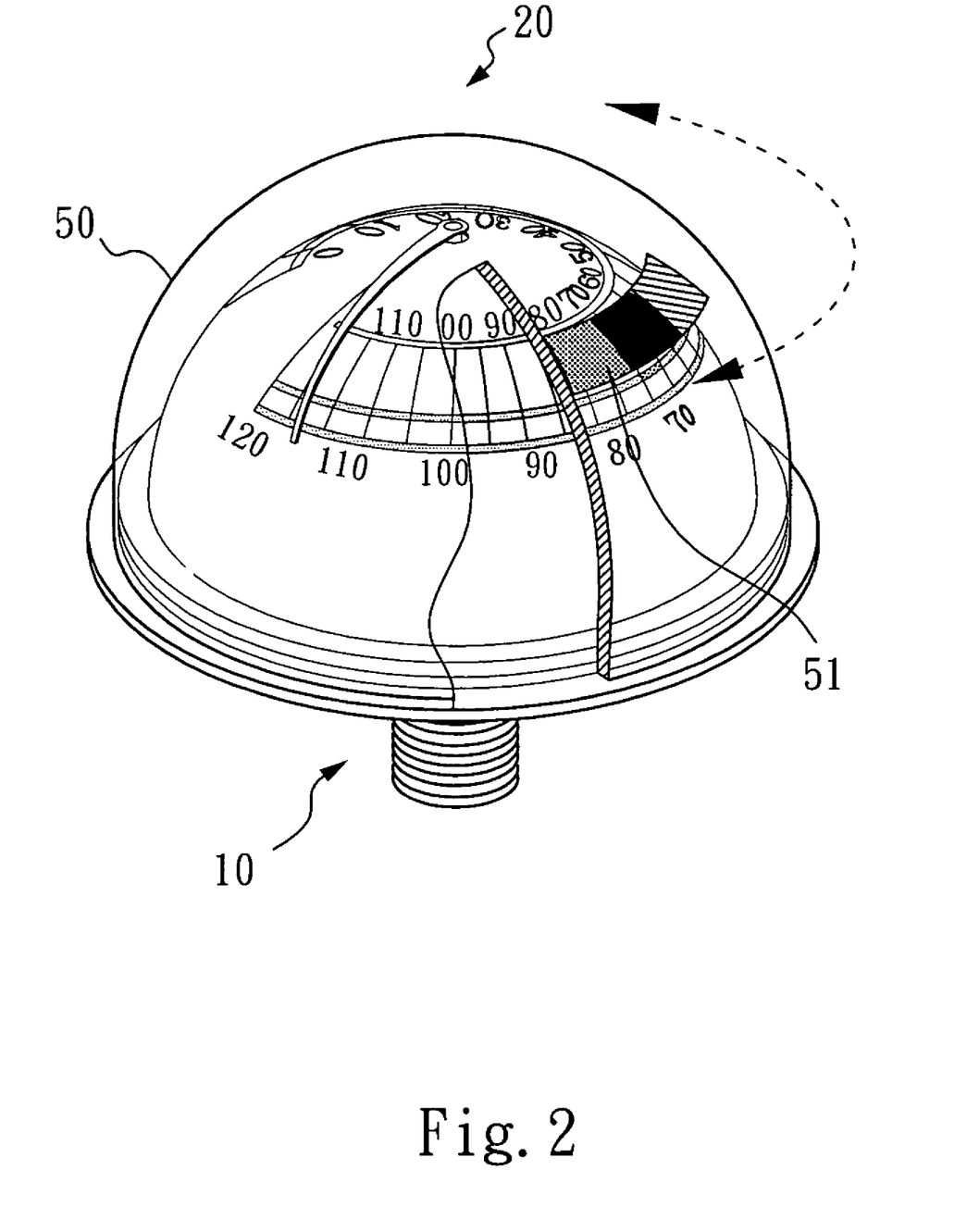
FIG. 2 is a schematic view of a second preferred embodiment of the present invention.

Referring to FIG. 2 which illustrates a schematic view of a second preferred embodiment of the present invention, a pressure gage 10 has the same improved pressure reading structure 20 as that of the first embodiment, except a rotable transparent protection casing 50 having a symbol 51 for showing a predetermined critical limit which is changeable when the position of the symbol 51 is changed by rotating the protection casing 50.

Figure 3:
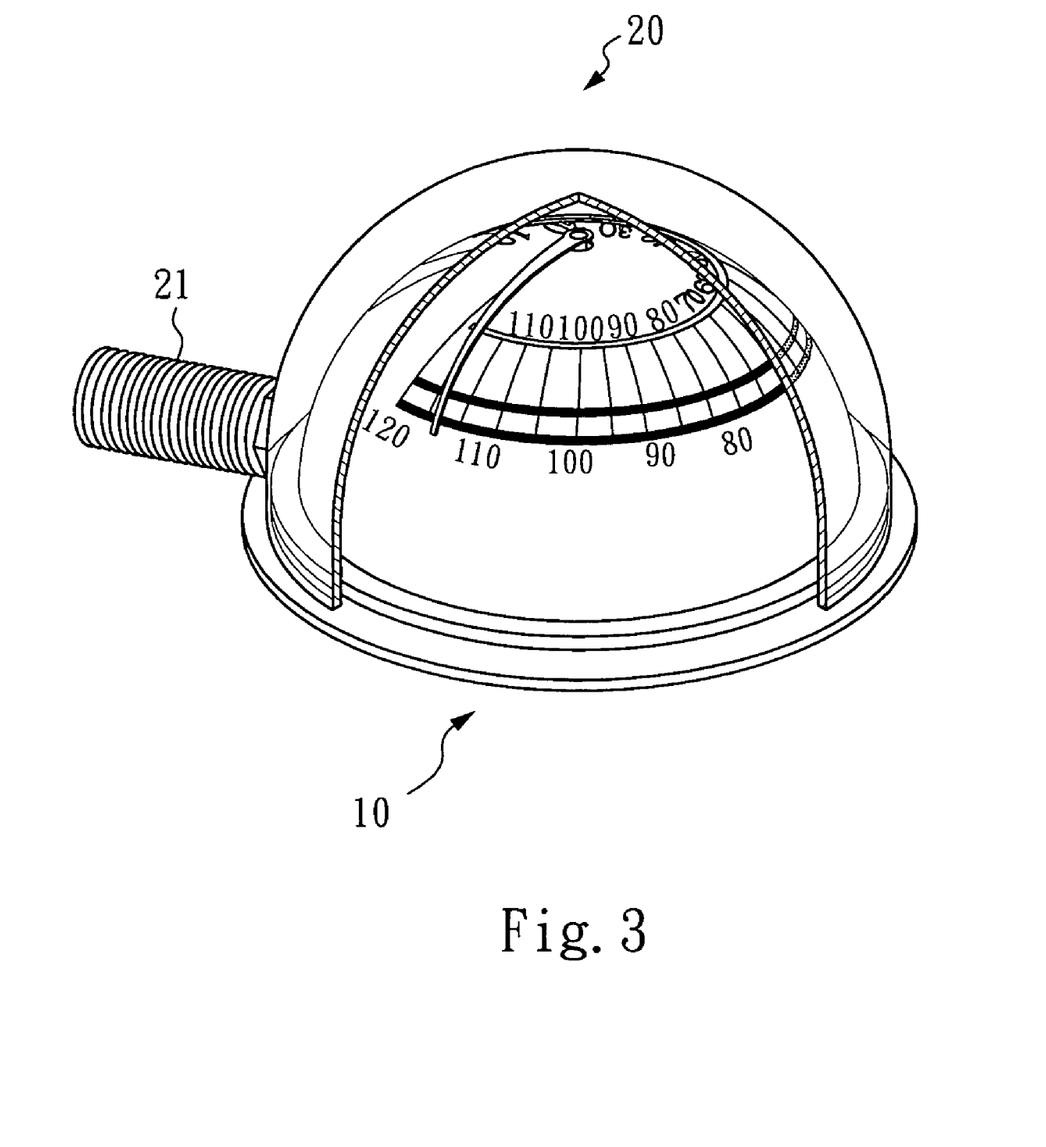
FIG. 3 is a schematic view of a third preferred embodiment of the present invention.

Further, FIG. 3 is a schematic view of a third preferred embodiment of the present invention. In FIG. 3, a pressure gage 10 has the same improved pressure reading structure 20 as that of the first embodiment, except a threading tube 21 which has external male threads and which projects from the lateral side of the improved pressure reading structure 20. Even so, this embodiment is capable of performing the same function as the first embodiment.

Figure 4:
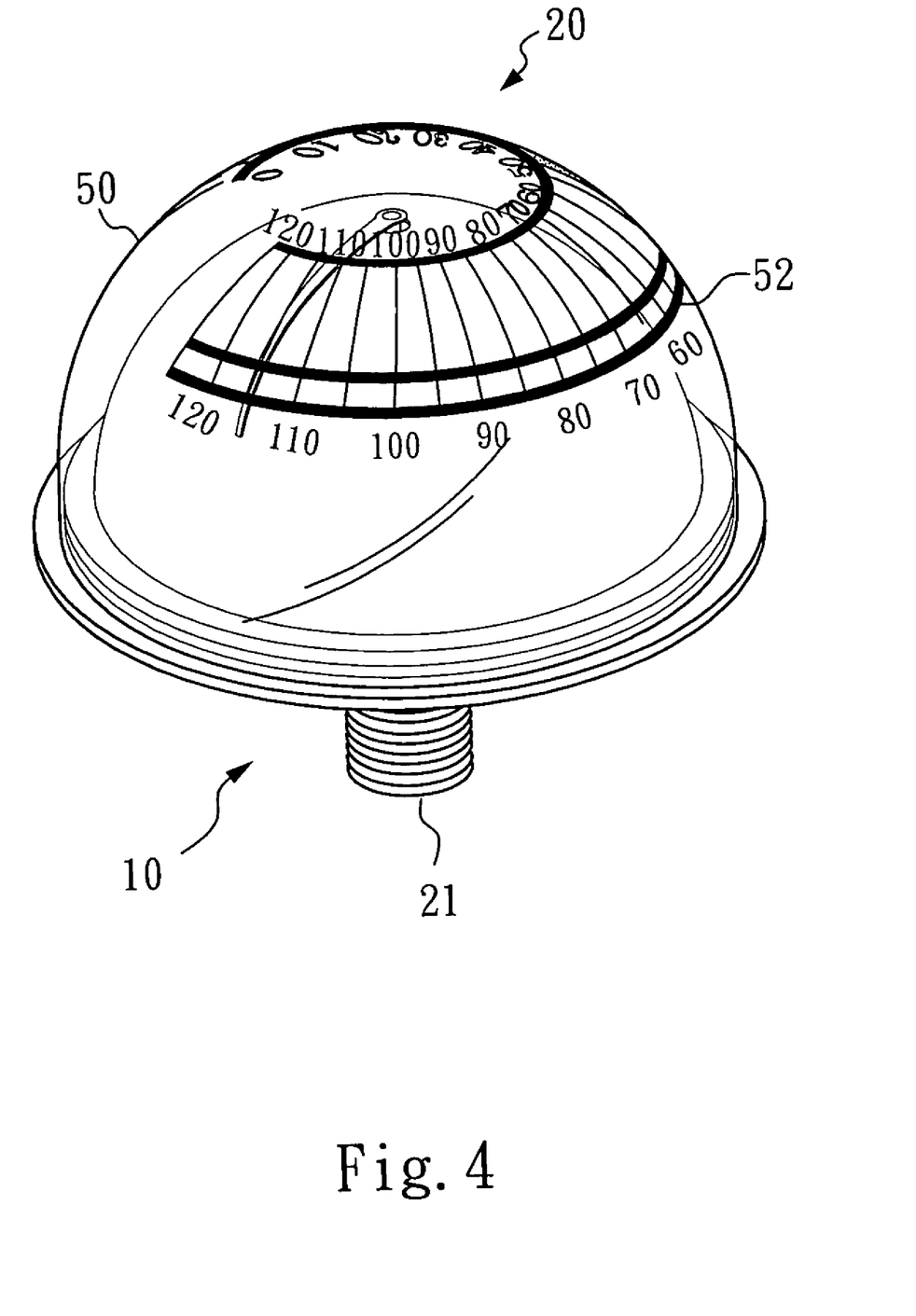
FIG. 4 is a schematic view of a fourth preferred embodiment of the present invention.

FIG. 4 is a schematic view of a forth preferred embodiment of the present invention. In FIG. 4, a pressure gage 10 has the same improved pressure reading structure 20 as that of the first embodiment, except a rotable transparent protection casing 50 which has indicia 52 thereon.

Figure 5:
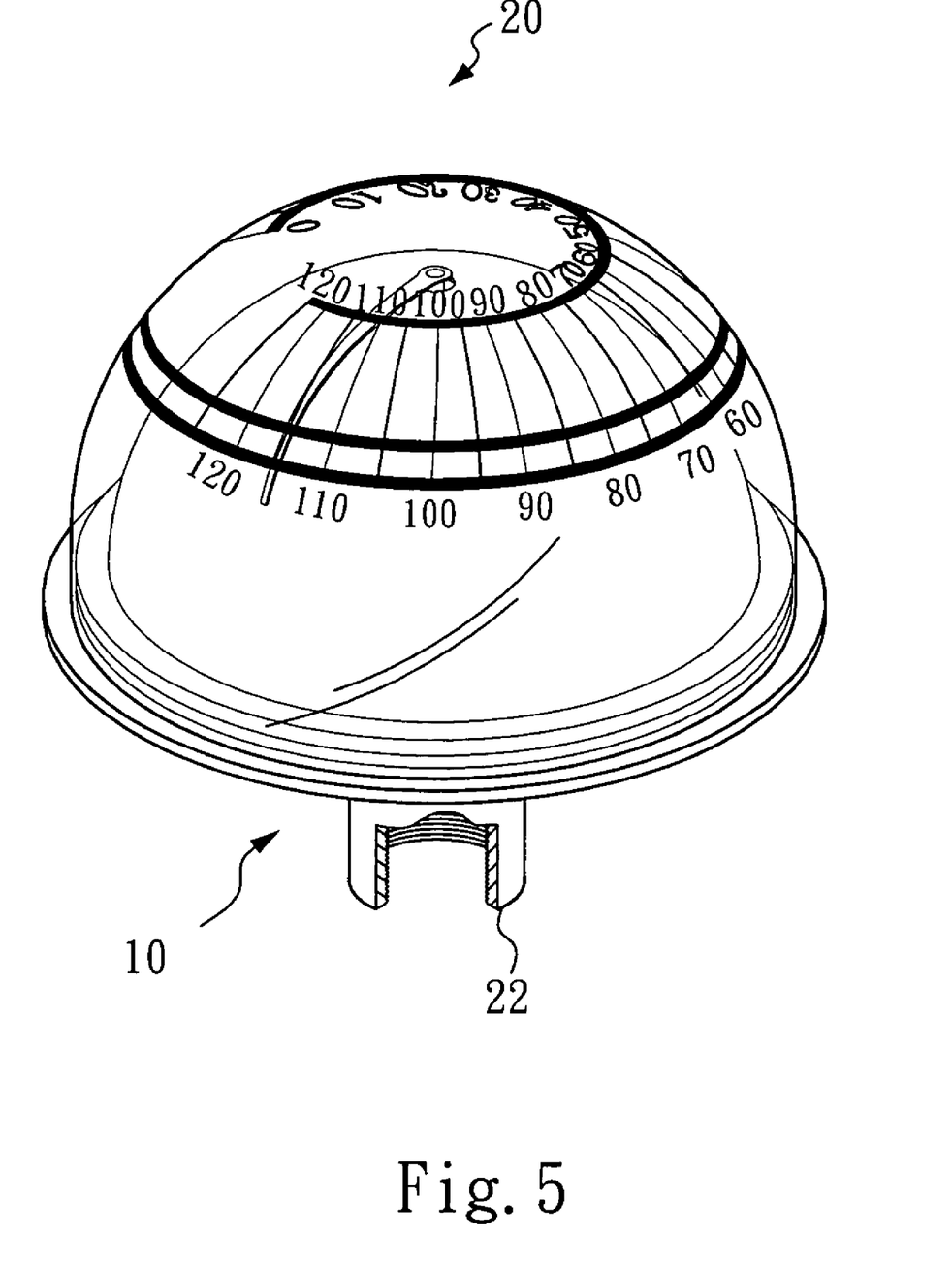
FIG. 5 is a schematic view of a fifth preferred embodiment of the present invention.

FIG. 5 is a schematic view of a fifth preferred embodiment of the present invention. This embodiment is the same as the fourth embodiment, except that the threading tube 21 (shown in FIG. 4) with external male theads, projecting from the bottom of the improved pressure reading structure 20 for the pressure gage 10, is replaced with a threading tube 22 with internal male threads so as to meet other demands and the object of the present invention.

Figure 6:
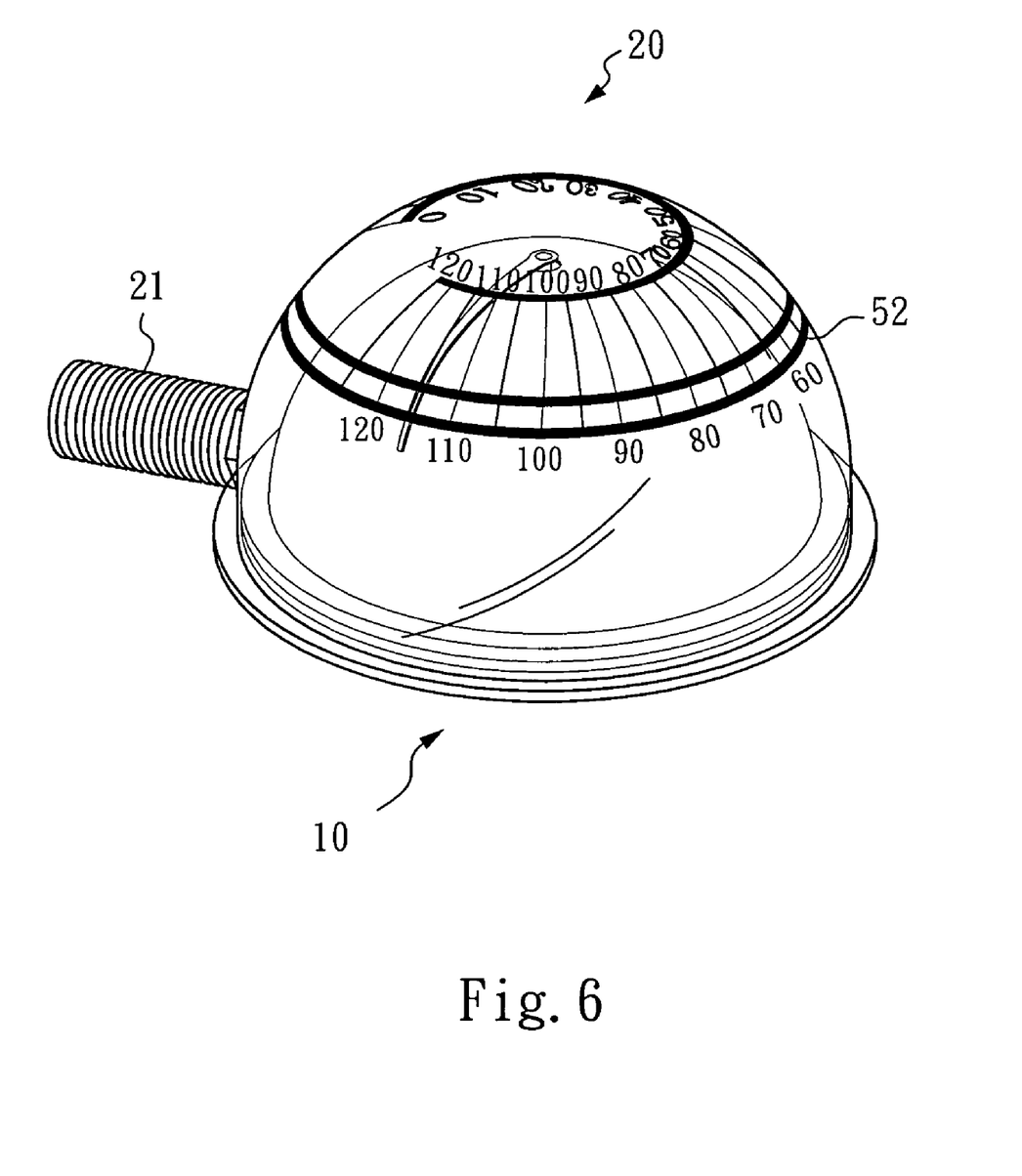
FIG. 6 is a schematic view of a sixth preferred embodiment of the present invention.

FIG. 6 is a schematic view of a sixth preferred embodiment of the present invention. This embodiment is equipped with the improved pressure reading structure 20 for the pressure gage 10 of the fourth embodiment, except the threading tube 21 (shown in FIG. 4) having external male threads is moved from the bottom of the improved pressure reading structure 20 to the lateral side of the improved pressure reading structure 20. Even so, this embodiment is capable of performing the same function as the fourth embodiment.

Figure 7:
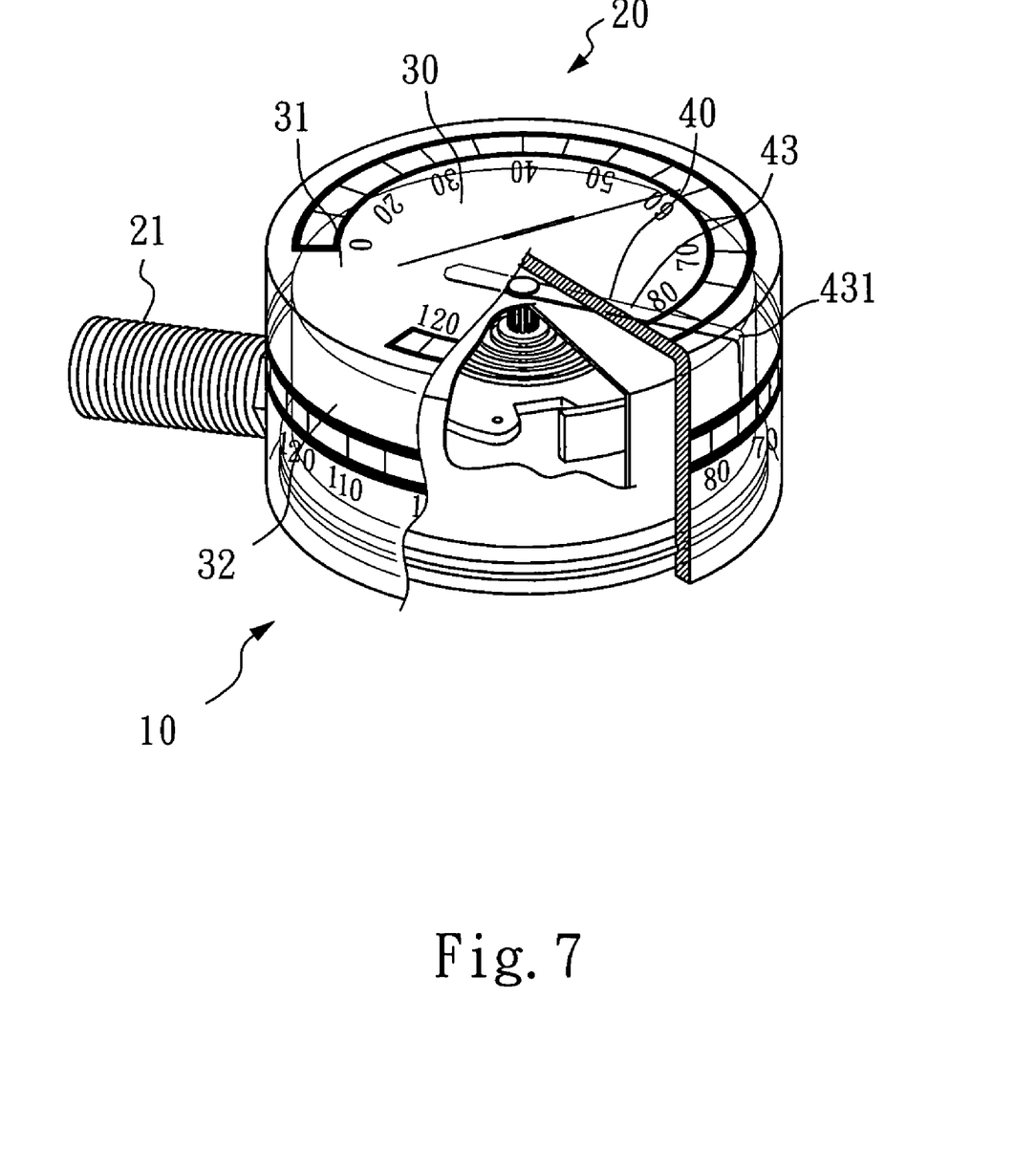
FIG. 7 is a schematic view of a seventh preferred embodiment of the present invention.

FIG. 7 is a schematic view of a seventh preferred embodiment of the present invention. It will be noticed that this embodiment is different from the first embodiment in that a data plate 30 is change to a cylindrical casing having a planar circle central area 31 and a cylindrical extended area 32 and that a rotable pointer 40 having a needle 43 corresponding to the data plate 30 to form a corner 431 so as to read gage pressure from different view angles and increase convenience to the use of the pressure gage.

Figure 8:
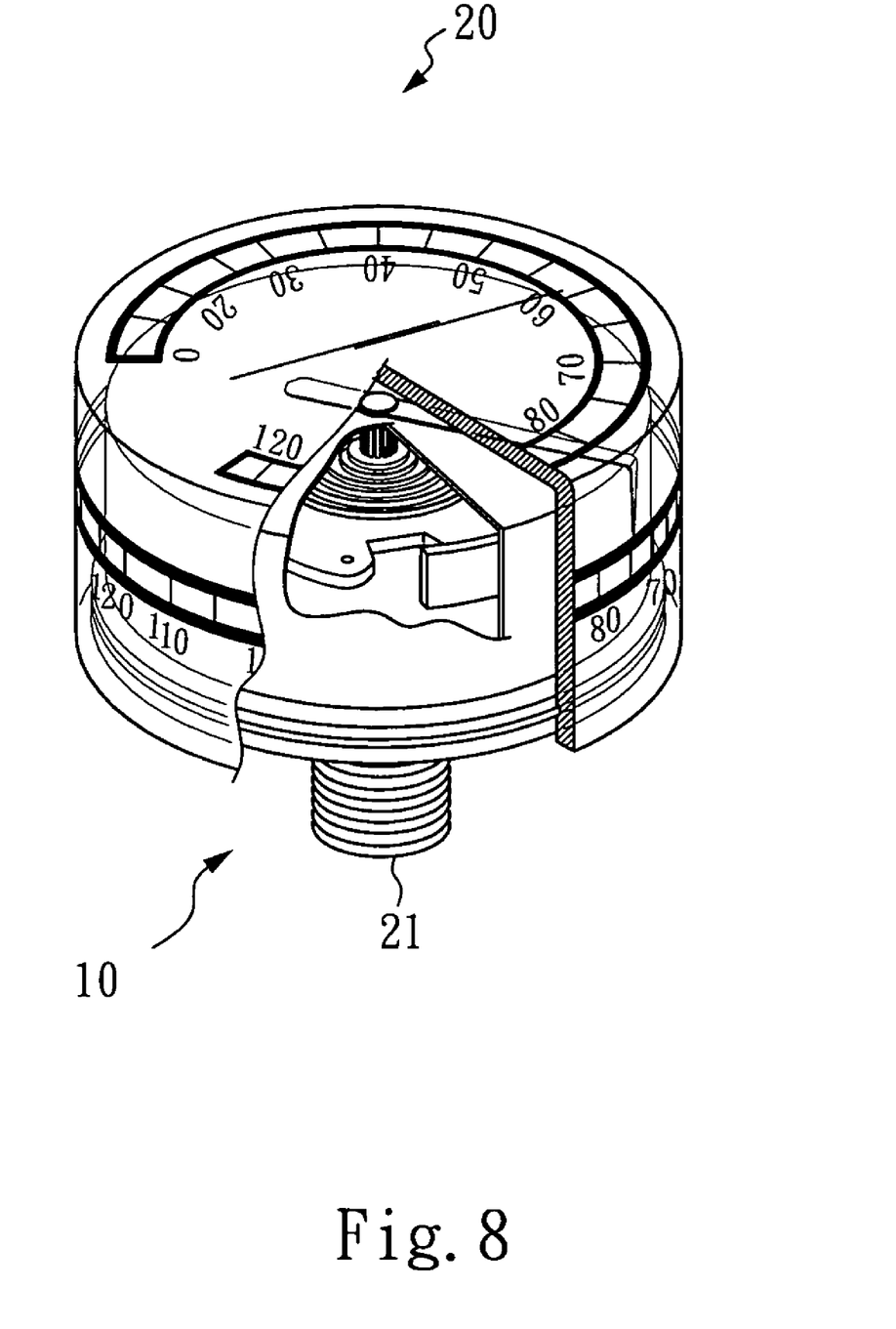
FIG. 8 is a schematic view of an eighth preferred embodiment of the present invention.

Referring to FIG. 8 which illustrates a schematic view of an eighth preferred embodiment of the present invention, an improved pressure reading structure 20 for a pressure gage 10 in this embodiment is the same as that of the seventh embodiment, except that the threading tube 21 (shown in FIG. 7) having external male threads is moved to the bottom of the improved pressure reading structure 20. Even so, this embodiment is capable of performing the same function as the seventh embodiment.

Although the present invention has been explained in relation to its preferred embodiments, it is to be understood that many other possible modifications and variations can be made without departing from the spirit and scope of the invention as hereinafter claimed.

What is claimed is:

1. An improved pressure reading structure for a pressure gage, comprising a data plate; a rotable pointer having a first end to serve as a rotation center, a second end to serve as an indicating end, and a needle between said first end and said second end; and a protection casing; characterized in that:
    said data plate including a central area and an extended area disposed next to and connected to said central area, both of said areas being positioned on different planes;
    said first end of said rotable pointer being mounted above said central area of said data plate, while said second end of said rotable pointer being mounted above said extended area of the data plate; and
    said needle of said rotable pointer being relative to said data plate to form a space.

2. The improved pressure reading structure for a pressure gage according to claim 1, wherein said data plate has indicia thereon.

3. The improved pressure reading structure for a pressure gage according to claim 1, wherein said data plate is shaped as a semi-circle body and said needle of said rotable pointer is shaped as an arc.

4. The improved pressure reading structure for a pressure gage according to claim 1, wherein said protection casing is transparent and rotable with a symbol marked thereon.

5. The improved pressure reading structure for a pressure gage according to claim 1, wherein said protection casing is transparent with indicia marked thereon.

6. The improved pressure reading structure for a pressure gage according to claim 1, wherein said data plate is shaped as a cylindrical casing having a planar circle central area and a cylindrical extended area, and wherein said needle of said rotable pointer corresponds to said data plate to form a corner.

\* \* \* \* \*